Dec. 25, 1956  J. M. CHAMBERS ET AL  2,775,178
ADJUSTING MECHANISM FOR TRACTOR MOUNTED IMPLEMENTS
Filed Oct. 26, 1951  3 Sheets-Sheet 1

INVENTORS
JOHN M. CHAMBERS
VINCENT A. STATHAM
BY
Carlson, Pitzner, Hubbard & Wolfe
ATTORNEYS

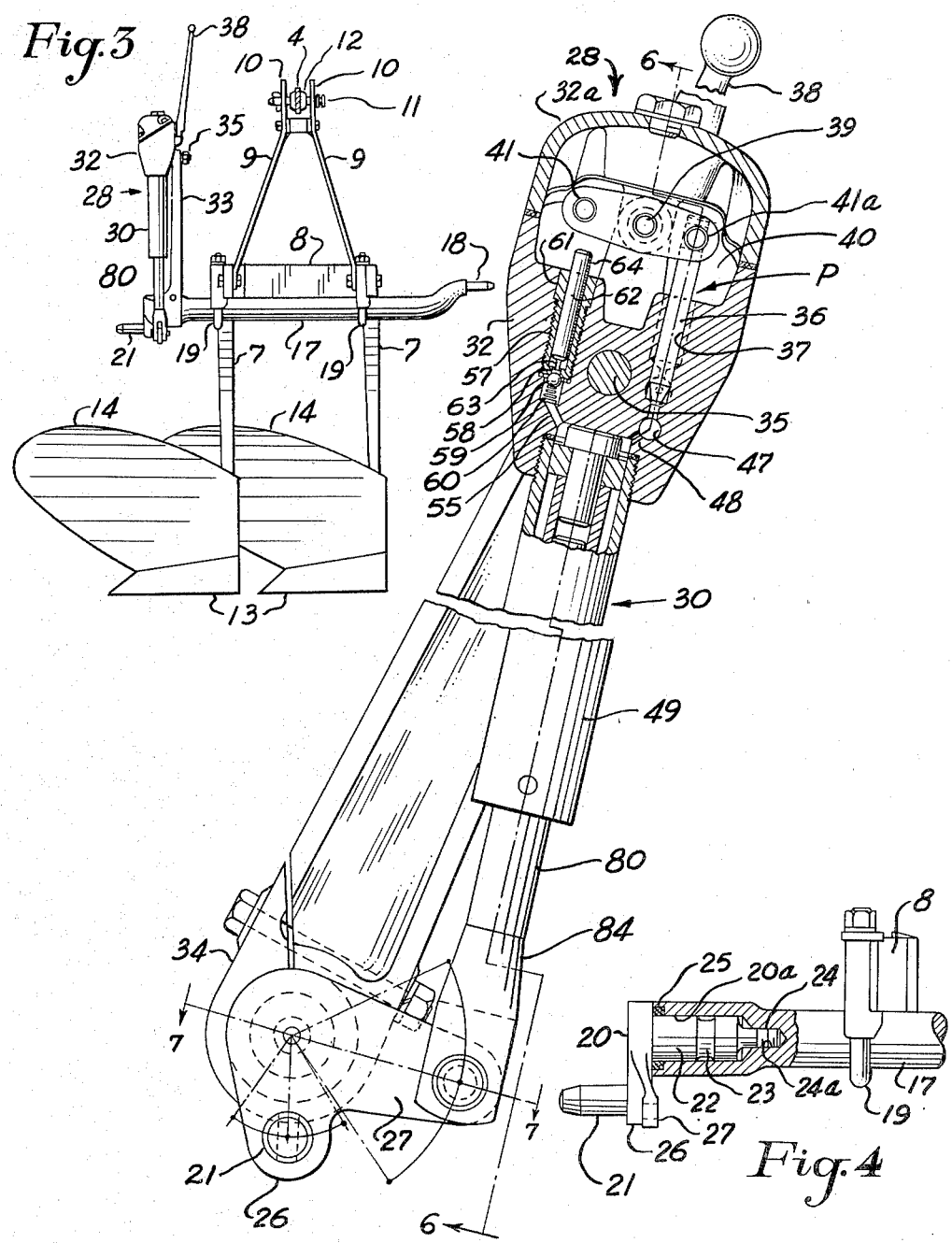

Dec. 25, 1956  J. M. CHAMBERS ET AL  2,775,178
ADJUSTING MECHANISM FOR TRACTOR MOUNTED IMPLEMENTS
Filed Oct. 26, 1951  3 Sheets-Sheet 3

INVENTORS
JOHN M. CHAMBERS
VINCENT A. STATHAM
BY
Carlsen, Pitzner, Hubbard & Wolfe
ATTORNEYS

United States Patent Office 2,775,178
Patented Dec. 25, 1956

2,775,178

ADJUSTING MECHANISM FOR TRACTOR MOUNTED IMPLEMENTS

John M. Chambers, Blackdown Hill, Leamington Spa, and Vincent A. Statham, Coventry, England, assignors to Massey-Harris-Ferguson (Sales) Limited, a British company Application October 26, 1951, Serial No. 253,416

4 Claims. (Cl. 97—46.59)

The invention relates to the attachment of unit-mounted implements to tractors of the type equipped with trailing, laterally spaced draft links and it is more particularly concerned with the attachment of an implement so that its operating position laterally of the tractor may be adjusted to best suit the conditions under which it is used.

In tractor-implement combinations of the above general character, the draft links are customarily pivotally attached both to the tractor and to the implement so that the implement may swing laterally and assume a position in which the draft and soil reaction forces are in equilibrium.

If the geometry of the quadrilateral figure above referred to is altered as, for example, by changing the effective length of one or the other of the draft links, the angular disposition of the implement relative to the tractor is changed. This change in position disturbs the equilibrium of the forces acting on the implement which is thus caused to shift laterally with respect to the tractor through the swinging of the hitch linkage until equilibrium is restored.

In implements such as plows, the above type of adjustment may be utilized to advantage for regulating the width of the furrow made by the plow. Plows adapted for attachment to tractors through the medium of trailing draft links are usually provided with cross members having pins at opposite ends for connection with the draft links. To provide for adjustment of the furrow width, it has been the practice heretofore to mount one or both the pins eccentrically of the axis of the cross member. As the cross member is necessarily secured in very rigid relation to the other elements of the plow as, for example, by U-bolts or comparable clamping devices, the adjustment can be effected only after the clamping devices have been released to permit rotation of the cross member about its axis. Adjustment is thus a slow and laborious operation and moreover cannot be effected while the plow is being operated.

It has been proposed to arrange the cross member of the implement so that it could be rotated without requiring the removal or loosening of bolts or the release of clamping devices. While such arrangements permit of adjustment without interrupting operation of the implement, they have not proven satisfactory for the reason that the strength and rigidity of the implement structure is materially reduced.

With the above in view, one object of the invention is to provide improved implement attaching means of the above general character which can be readily adjusted to change the position of the implement laterally with reference to the tractor while the implement is in operation and which at the same time offers ample structural strength and rigidity.

Another object is to provide adjusting mechanism for implement attaching means of the above type which provides for adjustment of the implement in relatively small accurately regulated increments and which requires a minimum of physical effort on the part of the tractor driver in effecting the adjustments.

A further object is to provide pressure fluid operated means for effecting adjustment of the implement relative to the tractor in which the pressure fluid supply means and the pressure fluid responsive actuating means are incorporated in a simple, compact unit adapted to be mounted on the implement within easy reach of the driver of the tractor.

Other objects and advantages of the invention will become apparent from the following detailed description of the preferred embodiment illustrated in the accompanying drawings, in which:

Fig. 3 is a front view of the plow.

Fig. 4 is a fragmentary, partly sectioned, view of one end of the cross member of the plow.

Fig. 5 is a side view of the actuating unit forming a part of the adjusting mechanism with parts broken away to show details of construction.

For purposes of illustration the invention has been shown as embodied in a conventional two-bottom plow adapted for attachment to a tractor equipped with a power operated hitch linkage of the general type disclosed in the Ferguson Patent No. 2,118,180, issued May 24, 1938. It is to be understood, however, that the invention is not limited to use with the particular implement illustrated, but on the contrary may be incorporated in other implements of the type adapted for unit-mounting on a tractor. It is also to be understood that there is no intention to limit the invention to the engineering design details of the installation shown, but it is intended to cover all modifications and alternative constructions falling within the spirit and scope of the invention as expressed in the appended claims.

Figure 1:
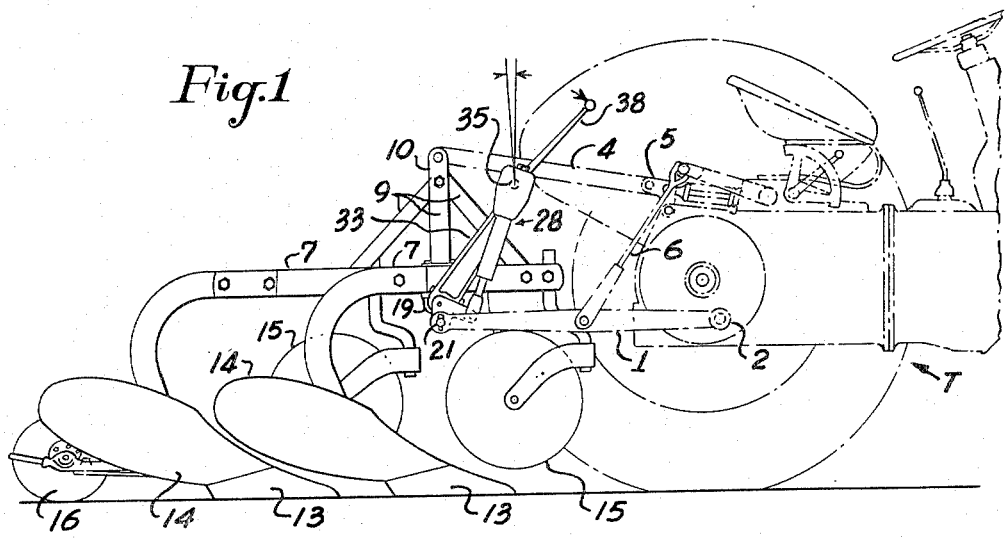
Figure 1 is a side view of a tractor and coupled plow equipped with adjustable attaching means embodying the features of the invention, the rear wheel of the tractor being omitted for the sake of clearness.
Figure 2:
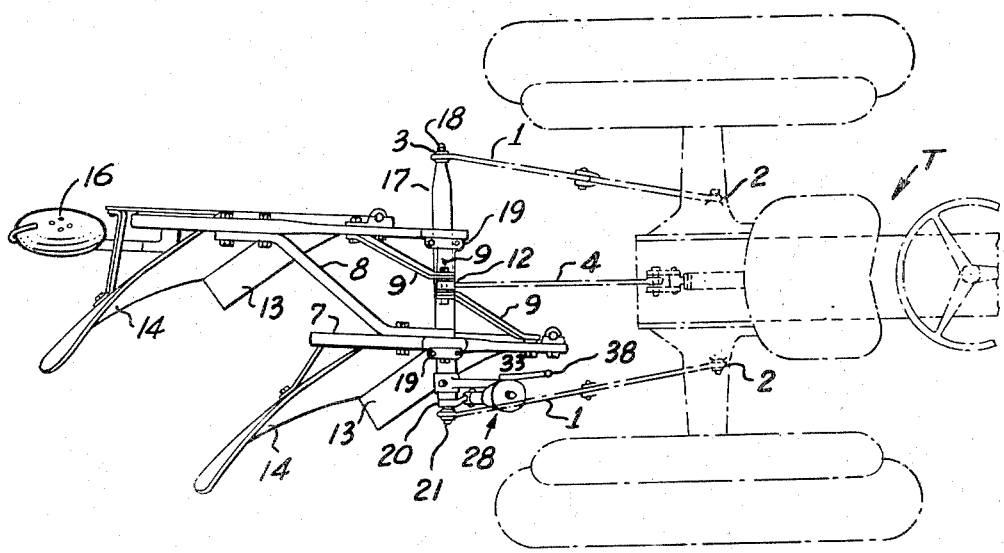
Fig. 2 is a plan view of the tractor and plow.

Referring now to Figs. 1 and 2 of the drawings, there is shown by way of illustration a conventional lightweight tractor T equipped with a hitch linkage for the attachment of unit-mounted implements, the linkage being actuated by a hydraulic power unit on the tractor for raising and lowering the implement. The hitch linkage comprises two lower or draft links 1 connected at their forward ends by ball joints 2 at opposite sides of the tractor differential housing for universal pivotal movement. At their rear ends, the links 1 are equipped with universally mounted balls 3 (Fig. 7) having apertures adapted to receive pins provided on an implement.

A top or compression link 4 forming a part of the hitch linkage is likewise universally attached by apertured balls at its forward end to the tractor and at its rear end to the implement. The connection with the tractor is effected through the medium of a rocker 5 through which the power unit of the tractor is controlled in well known manner to maintain a constant draft or soil pressure on the implement. The raising and lowering of the draft links 1 is effected through the medium of drop links 6.

By reference to Fig. 2, it will be observed that when an implement is attached to the tractor, the draft links 1 assume a convergent position such that lines drawn through their front and rear ends converge at a point near the center of the front axle of the tractor. As explained in the Ferguson Patent No. 1,916,945, issued July 4, 1933, this convergence of the links tends to cause the implement more closely to follow the steering movements of the tractor.

The implement shown by way of illustration is a conventional two-bottom plow having a rigid frame including two plow beams 7 spaced apart laterally and connected by a heavy crossbeam 8. An upstanding frame 9 on the implement has two spaced lugs 10 at the top adapted to receive a detachable pin 11 inserted through an apertured ball 12 in the rear end of the top link 4. Each of the plow beams 7 carries the usual plow bottom comprising a share 13 and a moldboard 14. Additionally, each plow beam carries a disc type coulter 15 and one of the beams carries a furrow wheel 16.

For attaching the plow to the draft links of the tractor, the plow frame is provided with a cross member or shaft 17 having at one end an axially projecting pin 18 for cooperation with the apertured ball 3 carried at the rear end of one of the draft links 1. In the particular plow shown, the end of the cross member carrying the pin 18 is offset from the axis of the member so as to locate the pin eccentrically of the member. It will be appreciated that in so far as the present invention is concerned the pin may be mounted in axial alinement with the member if desired. The cross member 17 is securely clamped to the two plow beams 7 as by U-bolts 19 and thus constitutes a definite part of the frame structure to which it contributes a substantial amount of strength and rigidity.

Figure 7:
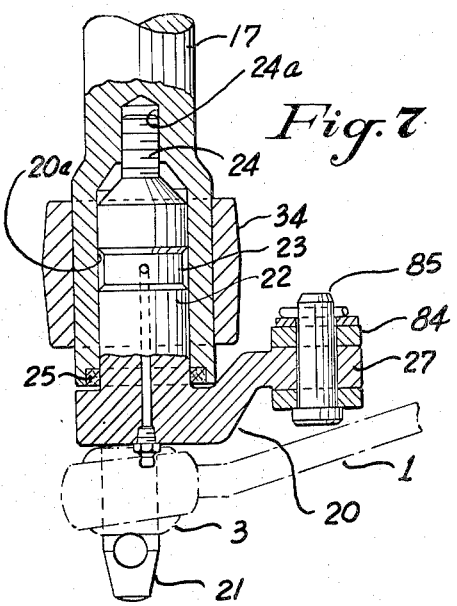
Fig. 7 is a sectional view taken in a plane substantially on the line 7—7 of Fig. 5.

At its other end, that is, at the end opposite the pin 18, the cross member 17 carries an adjustable member 20 supporting a second pin 21 for engagement with the other draft link of the tractor hitch. For this purpose the end of the cross member is enlarged as shown in Figs. 4 and 7 and formed with an axial bore 20a in which the adjustable member 20 is rotatably received with one end projecting for mounting the connecting pin 21. The pin 21 is located eccentrically with respect to the axis of the cross member 17 and the rotational axis of the adjustable member upon which it is mounted, as will appear presently.

The adjustable member 20 may be of any preferred form and as herein shown comprises a cylindrical body portion 22 having its central portion 23 reduced in diameter to define two spaced bearings engageable with the walls of the bore 20a. At its inner end, the body 22 terminates in a stud 24 threaded for engagement in a threaded hole 24a at the inner end of the bore to retain the parts in assembled relation. Preferably an oil seal ring 25 is provided adjacent the open end of the bore 20a to retain lubricant therein.

In the particular embodiment illustrated, the body 22 of the adjustable member is provided at its outer end with two radially extending crank arms 26 and 27 angularly spaced apart somewhat less than 90 degrees. One of these crank arms, in this instance the crank arm 26, carries the pin 21 while the other crank arm is operatively connected with actuating mechanism indicated generally at 28. In the midposition of adjustment the eccentric pin 21 is disposed vertically below the axis of the cross member 17 while the crank arm 27 is substantially at right angles to the axis of the actuating mechanism, as shown in Figs. 1 and 5.

The actuating mechanism 28 for the adjusting means is preferably of the pressure fluid operated type and, in the present instance, is in the form of a self-contained hydraulic jack device comprising a cylinder and piston actuator 30 and a small delivery, piston type pump P adapted for manual operation. The pump and actuator are assembled in a single compact unit, the pump being enclosed in a casing 32 at the lower end of which is mounted the actuator 30. This unit may be supported on the implement frame in any preferred manner. As herein shown, it is mounted on the cross member 17 through the medium of a supporting arm or bracket 33.

As shown in Figs. 3 and 5, the bracket 33 is clamped on the enlarged end of the cross member 17 by means of a split boss 34 provided on the lower end of the bracket, which is arranged to extend generally upwardly and forwardly from the cross member.

Figure 6:
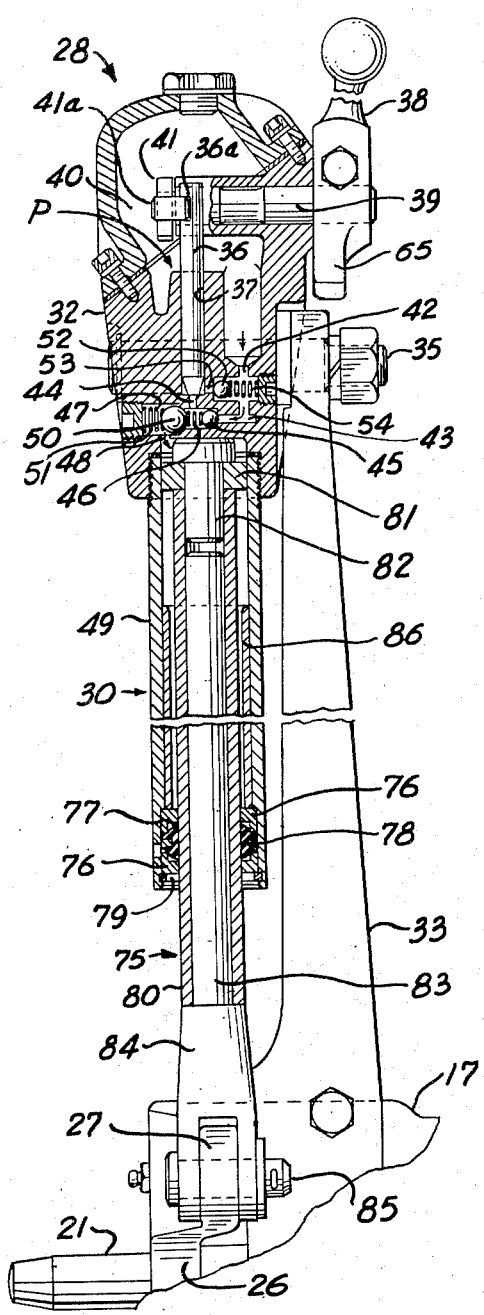
Fig. 6 is a sectional view taken in offset planes substantially on the line 6—6 of Fig. 5.

Referring now to Figs. 5 and 6, the housing 32 is pivotally mounted at the upper end of the bracket 33 as by a pivot pin 35 with the actuator 30 extending generally downwardly for connection with the crank arm 27. This pivotal mounting permits the jack device to swing in conformity with the rocking of the crank arm 27 on its axis.

Turning now to a more detailed description of the hydraulic jack device and referring more particularly to Fig. 5 of the drawings, the pump P comprises a single acting plunger 36 reciprocable in a cylindrical chamber 37 defined by a bore formed in the lower part of the casing 32. The particular pump shown is adapted to be operated manually, that is, the plunger 36 is reciprocated by means of a lever or handle 38 non-rotatably clamped to the projecting end of a shaft 39 which is journalled on and extends into the casing 32. The casing, incidentally, is hollow, and in conjunction with a cap or cover 32a removably secured to its upper end, defines a chamber 40 constituting a reservoir for the oil or other fluid utilized by the jack device.

For operating the plunger 36 the handle supporting shaft 39 has fixed on its inner end a crossbeam 41 adapted to rock with the shaft. At one end the crossbeam carries a pin 41a engageable in a transverse slot 36a adjacent the upper end of the pump plunger.

As shown in Fig. 6, the reservoir 40 communicates with the lower end of the pump chamber 37 through passages 42, 43 and 44. A ball valve element 45 biased against its seat by a spring 46 is interposed between the passages 43 and 44 to permit fluid flow in one direction, namely, into the lower end of the pump cylinder. The pump chamber thus receives its supply of fluid upon upward movement of the plunger 36.

Upon downward movement of the plunger, the fluid is discharged from the pump chamber through the passage 44 and branch passages 47 and 48, the latter of which opens into the upper end of a tubular member 49, which constitutes the cylinder of the actuator 30. A ball check valve 50 biased to closed position by a spring 51 prevents return flow of fluid from the cylinder to the pump chamber.

To prevent the development of excessive pressures in the jack device, a safety release valve including a ball element 52 is arranged to close a passage 53 connecting the pump chamber 37 with the passage 42 associated with the reservoir 40. A spring 54 biases the valve element 52 to closed position and yields to allow movement to open position when a predetermined pressure is exceeded.

Also provided in the casing 32 is a passage 55 (Fig. 5) for venting the cylinder 49 of the jack device to retract the piston therein. The passage 55 opens into the lower end of a stepped chamber 56 into which is threaded a hollow bushing 57. At its lower end the bushing 57 is apertured to provide a fluid port 58 which is normally closed by a ball element 59 biased by a spring 60. The bushing 57 together with an apertured collar 61 fitted into the bore 56 above the bushing, serve as guides for a slidable plunger 62 having its lower end portion 63 reduced in diameter to enable it to pass through the port 58 and displace the ball valve element 59 from its seat when the plunger is depressed. Preferably, the plunger 62 is formed at one side with a flat 64 extending throughout its length and defining a passage for the flow of fluid from the port 58 back to the reservoir 40. To permit control of the vent valve by the pump handle 38, the plunger 62 is supported with its upper end in position to be engaged by the end of the crossbeam 41 remote from its connection with the pump plunger 36.

The normal limits of the pump operating stroke of the handle 38 are defined by a tailpiece 65 rigid with the handle and cooperating with a pair of fixed stops on the casing 32. One of the stops 66 is a fixed stop in the form of a lug integral with the casing. The other stop which defines the limit position of the handle in its movement toward release position incorporates retarding means for warning the operator that the handle is approaching the release position. To this end the stop is preferably in the form of a round headed plunger button 67 supported in a screw plug 68 closing the outer end of a bore 69 in a boss 70 formed on the casing 32. A spring 71 within the bore urges the plunger button outwardly.

Figure 8:
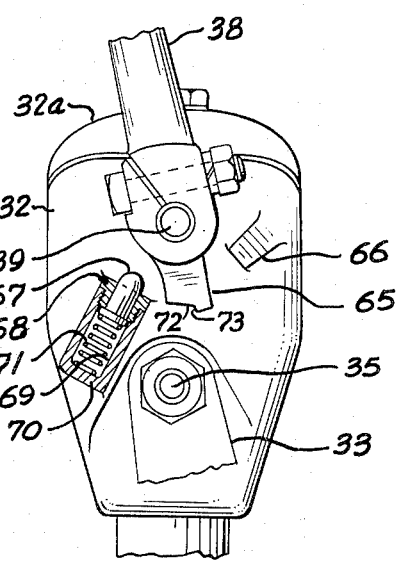
Fig. 8 is a side elevational view of the upper part of the actuating mechanism.

As shown in Fig. 8, the tailpiece 65 is formed with a stepped end including an arcuate section 72 terminating in an abrupt radial shoulder 73. The arrangement is such that the tailpiece initially engages and depresses the plunger button 67 which rides over the section 72 until the shoulder 73 engages the plug 68 and positively blocks further movement of the handle. Upon initial engagement of the tailpiece with the button, there is a distinct shock felt on the handle 38 to indicate to the operator that the release valve 59 will be opened upon further movement of the handle in the same direction.

The pressure fluid operated actuator or jack device 30 may be of any preferred construction. As indicated heretofore, the device is of the cylinder and piston type, the cylinder being defined by the tubular member 49. In the exemplary embodiment, the cylinder member 49 is screw threaded into a recess in the lower end of the casing 32 with its interior in communication with the pump chamber 37 through the various passages above described.

The cylinder 49 is fitted with a piston assembly 75 which projects from the lower end of the cylinder and is guided in its reciprocation by a gland assembly comprising a pair of spaced collars 76 between which is sandwiched a ring 77 of rubber or other suitable material bonded on a steel ring 78. The gland assembly is retained in place in the cylinder by a downwardly facing shoulder formed around the wall of the cylinder and a resilient locking ring 79 seated in a circumferential groove in the cylinder wall.

The piston assembly 75 in its preferred form comprises a tubular outer member 80 slidably received in the gland assembly and having at its upper end a split guide collar 81 engageable with the walls of the cylinder 49. As herein shown, the collar 81 is secured to the tubular member 85 by a stud 82 fitted into the upper end of the member. Slidably fitted into the tubular member 80 is a rod 83 having at its lower end an enlarged head 84 engageable by the lower end of the tubular member to receive a pushing force therefrom. The head 84 is bifurcated as shown in Fig. 6 to straddle the crank arm 27 on the adjustable member 20, and is pivotally connected thereto as by a pin 85.

With the arrangement above described the rod 83 and consequently the crank arm 27 will be pushed downwardly upon admission of pressure fluid into the upper end of the cylinder 49. Additionally the rod may slide downwardly and away from the tubular member 80 so that the position of the latter is unaffected by any movement of the crank arm which may take place when the latter is rocked downwardly as, for example, when the plow is lifted from working position. Thus in effect there is a one-way connection between the jack device and the eccentric pin 21 of the hitch mechanism so that the jack device is adapted to move the pin from one extreme position, in this instance the position to which it is normally urged by the soil pressure on the plow. This action may be more readily seen by reference to Fig. 1, wherein the soil pressure on the plow tends to rotate the adjustable member 20 and cranks 26 and 27 in a counterclockwise direction. When the plow is raised from the ground it tends to swing forwardly about the top link connection and the crank arm will rotate clockwise until the shaft center is below the pin 21. Due to the one-way connection with the jacking device above described, such rotation can take place freely without imposing a suction effect upon the jack device which might cause entry of air or otherwise disturb the setting of the same. At the same time adjustments of the eccentric pin may be made while the plow is in working position by simply forcing fluid under pressure into the upper end of the cylinder 49. The limit of such adjustment is defined in this instance by a stop sleeve 86 fitted within the cylinder 49 and engageable by the collar 81 upon movement of the piston assembly to its outer limit position.

It will be apparent from the foregoing that the invention provides adjusting mechanism of a novel and advantageous character by which an implement may be adjusted laterally with respect to the tractor to which it is hitched. Moreover, such adjustment may be effected while the implement is in operation. Although not limited to such use, the invention finds particular utility in connection with the operation of tractor drawn plows, the adjustment being utilized in such cases to regulate the furrow width.

The means for effecting the adjustment, namely the hydraulic jacking device with associated small capacity pump permits adjustments to be made in very small increments and with a high degree of precision. Furthermore, the mechanical advantage afforded by this adjusting means allows the adjustment to be made against the substantial soil forces acting on tthe implement while it is in actual operation.

Of particular importance is the fact that the strength and rigidity of the implement structure is not impaired by incorporating the improved adjusting mechanism therein. The conventional adjustment may still be effected, of course, by loosening the U-bolts 19 and bodily turning the cross member or shifting it laterally axially of the implement. In general, it is evident that the adjusting mechanism is simple and rugged in construction and easily operated to condition the implement with which it is associated for most efficient operation.

We claim as our invention:

1. In an implement adapted to be coupled to a tractor having a pair of trailing laterally spaced draft links, the combination of a pair of connecting elements on the implement for attachment to the respective draft links of the tractor, a movable member for supporting one of said connecting elements, a cylinder and piston drive connected between a stationary part of the implement and said movable member, and a manually operable pump connected to supply pressure fluid to said device, said pump being mounted on the implement for convenient access to the driver of the tractor while operating the same.

2. In an implement adapted to be coupled to a tractor having a pair of trailing laterally spaced draft links, the combination of a pair of connecting elements on the implement for attachment to the respective draft links of the tractor, a member rotatably mounted on the implement and supporting one of said elements eccentrically of its rotational axis, a pressure fluid operated device operable to rotate said member, and a manually operable pump connected to supply pressure fluid to said device.

3. In an implement adapted to be coupled to a tractor having a pair of trailing laterally spaced draft links, the combination of a cross member rigid with the implement, connecting elements carried at opposite ends of the cross member for connection with the respective draft links of the tractor, one of said connecting elements being located eccentrically with respect to the other element, means for adjusting the eccentricity of said one element comprising a cylinder and piston device mounted on the implement, a small discharge hydraulic pump connected to said device for supplying pressure fluid thereto, and a handle for manually operating said pump to effect said adjustment in small increments.

4. In an implement adapted to be coupled to a tractor having a pair of trailing laterally spaced draft links, the combination of a cross member rigid with the implement, connecting elements carried at opposite ends of the cross member for connection with the respective draft links of the tractor, one of said connecting elements being located eccentrically with respect to the other element, pressure fluid operated mechanism operable to adjust the eccentricity of said one element, said mechanism including a cylinder and piston device, a pump, valves controlling the flow of pressure fluid to and from said device, and a fluid reservoir, the elements of said mechanism being assembled in a unitary structure and mounted on the implement for convenient access by the driver of the tractor.

References Cited in the file of this patent

UNITED STATES PATENTS

| | | |
|---|---|---|
| 1,916,945 | Ferguson | July 4, 1933 |
| 2,283,593 | Akins | May 19, 1942 |
| 2,324,840 | Hipple | July 20, 1943 |
| 2,473,694 | Renick | June 21, 1949 |
| 2,530,565 | Briscoe | Nov. 21, 1950 |
| 2,580,532 | Dugger | Jan. 1, 1952 |
| 2,587,763 | Rimple | Mar. 4, 1952 |

FOREIGN PATENTS

| | | |
|---|---|---|
| 556,793 | Great Britain | Oct. 21, 1943 |